United States Patent [19]

Ohashi et al.

[11] Patent Number: 4,604,873
[45] Date of Patent: Aug. 12, 1986

[54] AIR CONDITIONING UNIT FOR AUTOMOBILES

[75] Inventors: Toshio Ōhashi, Atsugi; Yasushi Yamamoto, Zama, both of Japan

[73] Assignee: Nissan Motor Co., Ltd., Yokohama, Japan

[21] Appl. No.: 676,930

[22] Filed: Nov. 30, 1984

[30] Foreign Application Priority Data

Dec. 1, 1983 [JP] Japan ................. 58-227524

[51] Int. Cl.⁴ .................. G05D 23/32; F25D 17/00
[52] U.S. Cl. ........................... 62/158; 62/180; 62/244
[58] Field of Search .............. 62/158, 186, 180, 243, 62/244, 239; 98/2.11; 165/42, 43

[56] References Cited

U.S. PATENT DOCUMENTS 4,136,730  1/1979  Kinsey ................. 62/231 X

FOREIGN PATENT DOCUMENTS 0015010  1/1982  Japan ..................... 62/239

Primary Examiner—Harry Tanner
Attorney, Agent, or Firm—Schwartz, Jeffery, Schwaab, Mack, Blumenthal & Evans

[57] ABSTRACT

An air conditioning unit for automobiles is equipped with a bypass passage around the evaporator therein which is adapted to pass a substantial part of the ambient air introduced into the air conditioning unit when the air conditioning is halted. In addition, a control means is provided for controlling the operation of the bypass passage, specifically a time delay circuit to delay the opening and closing of the bypass passage when the air conditioning is stopped and started.

7 Claims, 2 Drawing Figures

AIR CONDITIONING UNIT FOR AUTOMOBILES

BACKGROUND OF THE INVENTION

1. Field of the Invention

This invention relates to an air conditioning unit for automobiles, more specifically, a bypass means for the ambient air introduced into the air conditioning unit to bypass the evaporator therein.

2. Description of the Prior Art

A conventional air conditioning unit for automobiles of the type disclosed, for example, in Japanese Patent Published Application No. SHO-57-172815 comprises a casing for defining a ventilation duct, a fan for drawing the ambient air into the ventilation duct, an evaporator for dehumidifying the introduced ambient air, a heater core for heating the introduced ambient air, and a water collecting portion formed on the bottom wall of the casing near the evaporator so as to receive the water produced at and dripping from the evaporator. The water collecting portion is provided with a drain means to exhaust the collected water out of the air conditioning unit.

Since the evaporator in the conventional air conditioning unit is disposed transversely across the ventilation duct, the ambient air introduced is subject to the flow resistance of the evaporator, thereby decreasing the ventilation efficiency. This is particularly true when it is intended to draw the ambient air into the passenger compartment through ram pressure during running while the air conditioning is halted, or when the fan is operated in order to positively draw the ambient air into the passenger compartment for strong ventilation while the air conditioning is halted.

In addition, when the air conditioning unit is turned on after parking in the hot sunshine, the air emanating from the unit is inclined to smell, which is caused by the warmed evaporator. It takes a relatively long time to cool the warmed evaporator with the ambient air drawn into the conventional air conditioning unit because the ambient air is subject to the flow resistance of the evaporator as set forth previously.

SUMMARY OF THE INVENTION

It is therefore a primary object of this invention to improve the ventilation efficiency of the passenger compartment of an automobile.

It is another object of this invention to provide an air conditioning unit which reduces the flow resistance in a ventilation duct containing an evaporator therein so as to always introduce a sufficient amount of air through the air conditioning unit.

It is another object of this invention to provide an air conditioning unit which can draw a sufficient amount of the ambient air through ram pressure during running with the air conditioning being halted.

It is another object of this invention to provide an air conditioning unit which can draw a sufficient amount of the ambient air when a fan is operated to introduce the ambient air into the passenger compartment for ventilation with the air conditioning being halted.

It is another object of this invention to provide an air conditioning unit which does not smell even when started after parking in the hot sunshine.

It is another object of this invention to provide an air conditioning unit which is adapted to cool the evaporator therein immediately after the air conditioning unit is started.

It is another object of this invention to provide an air conditioning unit in which the water produced at and dripping from the evaporator is substantially exhausted from the air conditioning unit before a large amount of the ambient air is drawn into the air conditioning unit.

According to the present invention, the air conditioning unit is equipped with a bypass passage around evaporator which is adapted to pass a substantial part of the ambient air introduced into the air conditioning unit, and a control means to control the operation of the bypass passage.

These and other aspects and advantages of the invention will become apparent by reference to the following detailed description of a preferred embodiment when considered in conjunction with the accompanying drawing, wherein like numerals correspond to like elements throughout the drawing.

DETAILED DESCRIPTION OF THE EMBODIMENTS

Figure 1:
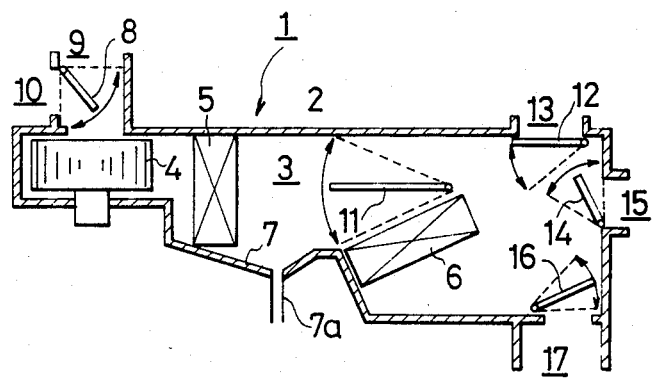
FIG. 1 is a schematic, cross sectional view of a conventional air conditioning unit.

Referring to FIG. 1, a conventional air conditioning unit generally designated by reference numeral 1 comprises a casing 2 for defining a ventilation duct 3. Arranged in series within the ventilation duct 3 are a fan 4, an evaporator 5 for dehumidification and a heater core 6. In order to collect water produced at and dripping from the evaporator 5, a water collecting portion 7 is defined by the bottom wall of the casing 2 near the evaporator 5. The water collecting portion 7 is formed with a drain conduit 7a at the bottom thereof through which the water collected at the water collecting portion 7 is exhausted from the air conditioning unit 1.

Provided adjacent to the fan 4 is an intake door 8 for opening and closing an external air inlet port 9 and an internal air inlet port 10 so as to change the external air introduction to the internal air introduction and vice versa.

Provided between the evaporator 5 and the heater core 6 is an air mixing door 11, whereas disposed downstream of the heater core 6 are a defroster door 12 formed at a defroster port 13, a ventilation door 14 provided at a ventilation port 15, and a floor door 16 mounted to a foot side port 17, the detailed description of which is omitted, since these components are arranged in a conventional manner.

In such a conventional air conditioning unit 1, the evaporator 5 is disposed transversely across the ventilation duct 3, so that the air flow resistance is relatively high.

Consequently, when the ventilation is carried out by introducing the ambient air into the passenger compartment through ram pressure during running while the air conditioning is halted by turning off the air conditioning switch (not shown) which is provided for control of the evaporator 5 and the heater core 6, or when the ventilation is forceably carried out by positively introducing the ambient air into the passenger compartment by turning on a fan switch (not shown) for operation of the fan 4 while the air conditioning is halted, it will be difficult to sufficiently introduce the ambient air into the passenger compartment, thereby causing the ventilation efficiency to be decreased.

Figure 2:
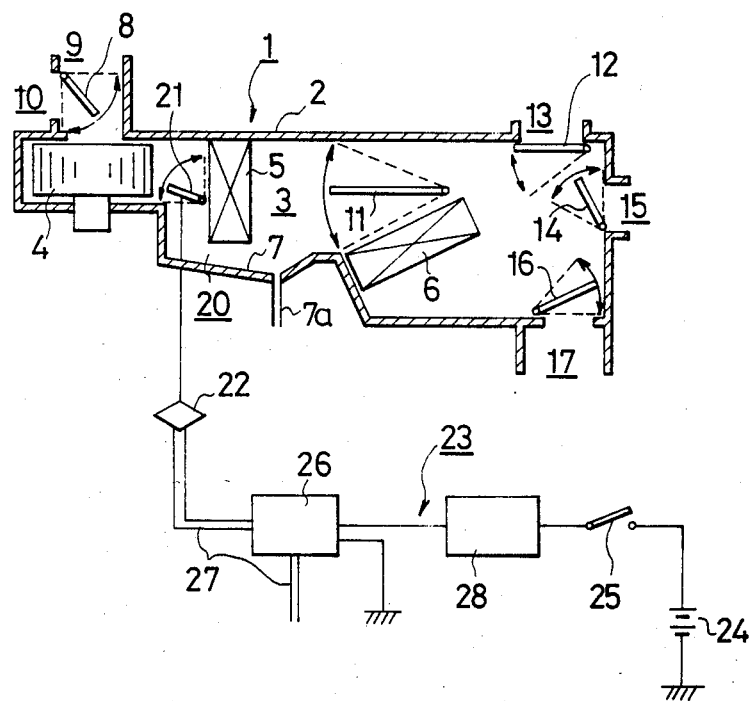
FIG. 2 is a schematic, cross sectional view of one embodiment of the air conditioning unit incorporating the present invention.

Now referring to FIG. 2 illustrating one embodiment of the present invention, an air conditioning unit 1 comprises a casing 2 defining a ventilation duct 3. Arranged in series within the ventilation duct 3 are a fan 4, an evaporator for dehumidification and a heater core 6, which are similar to those shown in FIG. 1.

In order to collect water produced at and dripping from the evaporator 5, a water collecting portion 7 is defined by the bottom wall of the casing 2 near the evaporator 5. The evaporator 5 is transversely disposed within the ventilation duct 3 with a space between the evaporator 5 and the bottom wall of the casing 2 at the water collecting portion 7. The description on the other elements which are the same as shown in FIG. 1 is omitted.

Extending through the space is a bypass passage 20 around the evaporator 5 for the ambient air drawn into the ventilation duct 3, which is detailed hereinafter.

As mentioned above, the space formed between the evaporator and the bottom wall of the casing at the water collecting portion substantially forms the bypass passage, which saves the total space of the casing 2, thereby keeping the air conditioning unit compact. However, the bypass passage can be formed through another space so long as it is disposed around the evaporator.

Disposed at the inlet portion of the bypass passage 20 is a door 21 for opening and closing the bypass passage 20. The door 21 is operated by an actuator, for example, a vacuum actuator 22 in the present embodiment, wherein the engine suction producing a negative pressure is utilized for the negative pressure source to operate the door 21.

The vacuum actuator 22 is controlled by an operation d.c. circuit 23 which comprises an electric source 24, an air conditioning switch 25, a vacuum switch 26 disposed within a negative pressure passage 27 of the vacuum actuator 22 for the controlled application of negative pressure, and a delay circuit 28, whereby the door 21 is closed when the air conditioning switch 25 is turned on, and opened when the same is turned off.

The delay circuit 28 is adapted to provide the air conditioning switch 25 producing on-off signals with a predetermined time delay.

In the structure as mentioned above, since the door 21 of the bypass passage 20 is open when the air conditioning switch 25 is turned off to stop the air conditioning, a substantial part of the ambient air drawn through ram pressure during running or forceably drawn through the fan 4 by turning on the fan switch (not shown) flows through the bypass passage 20 into the passenger compartment. Accordingly, the ambient air introduced is substantially not subject to the flow resistance due to the existence of the evaporator 5, so that the amount of the ambient air supplied to the passenger compartment is outstandingly increased.

In addition, when the engine is started after parking in the hot sunshine, the air conditioning switch 25 and the fan switch (not shown) will be turned on to operate the air conditioning unit 1. In such a condition, the delay circuit 28 interposed in the operation circuit 23 is operated to provide for a predetermined delay time before the door 21 is closed by the vacuum actuator 22. Consequently, a substantial part of the ambient air drawn into the ventilation duct 3 as mentioned previously flows continuously through the bypass passage 20 for a predetermined period of time, and portion of this air passes through the lower part of the evaporator to cool the evaporator 5, whereby the air emanating from the air conditioning unit 1 just after a start is prevented from smelling. Otherwise, the air will smell because it has to flow through the evaporator 5 which has been warmed in the hot sunshine.

Further, when the air conditioning switch 25 is turned off to halt the air conditioning unit 1, the delay circuit 28 provides for a predetermined time delay before the door 21 is opened. Accordingly, the water dripping from the evaporator 5 and collected in the water collecting portion 7 during the air conditioning operation is substantially exhausted from the ventilation duct 3 through the drain conduit 7a before the door 21 is opened to draw the ambient air into the bypass passage 20. The water otherwise remained in the water collecting portion 7 will splash due to the ambient air introduced just after the air conditioning unit 1 is halted, which may be carried by the flowing air to humidify the passenger compartment.

While a preferred embodiment of this invention has been shown and described, it will be appreciated that other embodiments will become apparent to those skilled in the art upon reading this disclosure, and, therefore, the invention is not to be limited by the disclosed embodiment. For example, an electric magnetic actuator may be used in place of the vacuum actuator 22 for operating the door 21.

What is claimed is:

1. An air conditioning unit for automobiles, comprising a casing defining a ventilation duct, an evaporator disposed within said ventilation duct, a water collecting portion formed on the bottom wall of said casing, said water collecting portion collecting the dripping water from said evaporator, a bypass passage, between said evaporator and the bottom wall of said casing, for bypassing said evaporator, a door for opening and closing said bypass passage, and an actuator comprising an operation circuit to operate said door, said operation circuit including a delay circuit interposed therein so as to provide the actuator with a time delay function to open said door to said bypass passage after a predetermined time delay when the air conditioning is stopped after operation, whereby the water collected in the water collecting portion is substantially exhausted from the air conditioning unit before the ambient air passes through said bypass passage.

2. The air conditioning unit of claim 1, wherein said door is operated by an air conditioning switch arranged in said operation circuit, wherein a signal produced by said air conditioning switch is delayed through said delay circuit.

3. The air conditioning unit of claim 1, wherein said actuator is a vacuum actuator connected to the engine suction for its negative pressure source.

4. The air conditioning unit of claim 3, wherein said vacuum actuator is connected through a negative pressure passage to a vacuum switch which is electrically connected to said time delay circuit in said operation circuit.

5. The air conditioning unit of claim 1, wherein said door is adapted to open said bypass passage when the air conditioning is halted, whereby a substantial part of the ambient air drawn into said air conditioning unit passes through said bypass passage.

6. The air conditioning unit of claim 1, wherein said door is adapted to close said bypass passage after a predetermined time delay when the air conditioning is started, whereby a substantial part of the ambient air drawn into said air conditioning unit passes through said bypass passage for a predetermined time.

7. The air conditioning unit of claim 6, wherein a portion of said substantial part of the ambient air is used for cooling said evaporator.

* * * * *